United States Patent
Sahadi et al.

(10) Patent No.: US 10,129,728 B2
(45) Date of Patent: Nov. 13, 2018

(54) WEARABLE DEVICE

(71) Applicant: Blazer and Flip Flops, Inc., San Diego, CA (US)

(72) Inventors: Scott Sebastian Sahadi, Solana Beach, CA (US); Benjamin Harry Ziskind, San Diego, CA (US); Joshua David Bass, Carlsbad, CA (US)

(73) Assignee: Blazer and Flip Flops, Inc., San Diego, CA (US)

( * ) Notice: Subject to any disclaimer, the term of this patent is extended or adjusted under 35 U.S.C. 154(b) by 0 days.

(21) Appl. No.: 15/383,710

(22) Filed: Dec. 19, 2016

(65) Prior Publication Data

US 2017/0162006 A1    Jun. 8, 2017

Related U.S. Application Data

(60) Provisional application No. 62/264,266, filed on Dec. 7, 2015.

(51) Int. Cl.
*G08B 1/08* (2006.01)
*H04W 4/80* (2018.01)
(Continued)

(52) U.S. Cl.
CPC .............. *H04W 4/80* (2018.02); *H04B 1/385* (2013.01); *H04W 4/02* (2013.01)

(58) Field of Classification Search
CPC .. G06Q 20/347; G06Q 20/10; G06Q 20/3226; G06Q 20/3278; G06Q 20/346;
(Continued)

(56) References Cited

U.S. PATENT DOCUMENTS

| 4,873,513 A | 10/1989 | Soults et al. |
| 5,978,744 A | 11/1999 | McBride |

(Continued)

FOREIGN PATENT DOCUMENTS

| EP | 1 288 627 | 3/2003 |
| WO | WO 2011/115855 | 9/2011 |

(Continued)

OTHER PUBLICATIONS

U.S. Appl. No. 15/271,087 Office Action dated Jun. 7, 2017.
(Continued)

*Primary Examiner* — Emily C Terrell
(74) *Attorney, Agent, or Firm* — Polsinelli LLP (57) ABSTRACT

A wearable device associated with a guest in a venue stores a unique identification code. The unique identification code may correspond to guest information stored at one or more guest information servers. The guest information may include ticket information, room entitlements, vouchers, payment information, credit card information, or folio information. The wearable device transmits unique identification code to a venue scanner associated with a venue device. The venue device may obtain access to at least some of the guest information based on receipt of the unique identification code. The wearable device also includes a light source that may indicate a status of the guest or of the wearable device based on the colors and/or the blinking patterns emitted by the light source. The light source may, for example, indicate a guest's access permissions to portions of the venue.

20 Claims, 9 Drawing Sheets

(51) Int. Cl.
*H04B 1/3827* (2015.01)
*H04W 4/02* (2018.01)

(58) Field of Classification Search
CPC ............ G06Q 20/3572; G06Q 20/405; G06K 19/0723; G06K 19/0727; G06K 7/10297
USPC ......................................... 340/539.1, 539.11
See application file for complete search history.

(56) References Cited

U.S. PATENT DOCUMENTS

| | | | |
|---|---|---|---|
| 6,142,368 A | 11/2000 | Mullins et al. | |
| 6,223,559 B1 * | 5/2001 | Coleman | A44C 15/0015 40/455 |
| 6,320,496 B1 | 11/2001 | Sokoler et al. | |
| 6,352,205 B1 | 3/2002 | Mullins et al. | |
| 6,369,840 B1 | 4/2002 | Barnett et al. | |
| 6,414,635 B1 | 7/2002 | Stewart et al. | |
| 6,474,557 B2 | 11/2002 | Mullins et al. | |
| 6,493,630 B2 | 12/2002 | Ruiz et al. | |
| 6,587,787 B1 | 7/2003 | Yokota | |
| 6,663,006 B2 | 12/2003 | Mullins et al. | |
| 6,687,608 B2 | 2/2004 | Sugimoto et al. | |
| 6,997,380 B2 | 2/2006 | Safael et al. | |
| 7,222,080 B2 | 5/2007 | Hale et al. | |
| 7,558,678 B2 | 7/2009 | Jones | |
| 7,802,724 B1 * | 9/2010 | Nohr | G07C 9/00111 235/384 |
| 7,992,773 B1 | 8/2011 | Rothschild | |
| 8,368,695 B2 | 2/2013 | Howell et al. | |
| 8,424,752 B2 | 4/2013 | Rothschild | |
| 8,427,510 B1 | 4/2013 | Towfiq et al. | |
| 8,433,342 B1 | 4/2013 | Boyle et al. | |
| 8,625,796 B1 | 1/2014 | Ben Ayed | |
| 8,651,369 B2 | 2/2014 | Rothschild | |
| 8,866,673 B2 | 10/2014 | Mendelson | |
| 8,936,190 B2 | 1/2015 | Rothschild | |
| 8,963,775 B2 | 2/2015 | Faragher | |
| 9,264,849 B1 | 2/2016 | Kahn et al. | |
| 9,488,085 B2 | 9/2016 | Bass | |
| 9,485,322 B2 | 11/2016 | Krishnaswamy et al. | |
| 9,491,584 B1 | 11/2016 | Mendelson | |
| 9,674,684 B1 | 6/2017 | Mendelson | |
| 9,741,022 B2 | 8/2017 | Ziskind | |
| 9,813,855 B2 | 11/2017 | Sahadi | |
| 9,813,862 B2 | 11/2017 | Liu et al. | |
| 9,829,339 B2 | 11/2017 | Bass | |
| 9,906,909 B2 | 2/2018 | Sahadi | |
| 9,909,896 B2 | 3/2018 | Bass | |
| 10,028,091 B2 | 7/2018 | Sahadi | |
| 2002/0007292 A1 | 1/2002 | Paxton et al. | |
| 2002/0029226 A1 | 3/2002 | Li et al. | |
| 2002/0055863 A1 | 5/2002 | Behaylo | |
| 2002/0194246 A1 | 12/2002 | Moskowitz et al. | |
| 2003/0007464 A1 | 1/2003 | Balani | |
| 2004/0224703 A1 | 11/2004 | Takaki et al. | |
| 2005/0114014 A1 | 5/2005 | Isaac | |
| 2006/0074550 A1 | 4/2006 | Freer et al. | |
| 2006/0087474 A1 | 4/2006 | Do et al. | |
| 2006/0106850 A1 | 5/2006 | Morgan et al. | |
| 2007/0032269 A1 | 2/2007 | Shostak | |
| 2007/0118415 A1 | 5/2007 | Chen et al. | |
| 2007/0174115 A1 | 7/2007 | Chieu et al. | |
| 2007/0197247 A1 | 8/2007 | Inselberg | |
| 2007/0225904 A1 | 9/2007 | Patanlone et al. | |
| 2007/0239348 A1 | 10/2007 | Cheung | |
| 2007/0270166 A1 | 11/2007 | Hampel et al. | |
| 2008/0059889 A1 | 3/2008 | Parker et al. | |
| 2008/0067244 A1 * | 3/2008 | Marks | G01V 15/00 235/385 |
| 2008/0183582 A1 | 7/2008 | Major | |
| 2008/0186164 A1 | 8/2008 | Emigh et al. | |
| 2008/0290182 A1 | 11/2008 | Bell et al. | |
| 2008/0306826 A1 | 12/2008 | Kramer et al. | |
| 2008/0312946 A1 | 12/2008 | Valentine et al. | |
| 2009/0017798 A1 | 1/2009 | Pop | |
| 2009/0027418 A1 | 1/2009 | Maru et al. | |
| 2009/0055208 A1 | 2/2009 | Kaiser | |
| 2009/0089131 A1 | 4/2009 | Moukas et al. | |
| 2009/0265428 A1 | 10/2009 | Light et al. | |
| 2009/0319306 A1 | 12/2009 | Chanick | |
| 2009/0319616 A1 | 12/2009 | Lewis et al. | |
| 2010/0037141 A1 | 2/2010 | Carter et al. | |
| 2010/0042320 A1 | 2/2010 | Salmre et al. | |
| 2010/0063854 A1 | 3/2010 | Purvis et al. | |
| 2010/0077036 A1 | 3/2010 | DeLuca et al. | |
| 2010/0161432 A1 | 6/2010 | Kumanov et al. | |
| 2010/0194784 A1 | 8/2010 | Hoff et al. | |
| 2011/0054976 A1 | 3/2011 | Adler et al. | |
| 2011/0078026 A1 | 3/2011 | Durham | |
| 2011/0090123 A1 | 4/2011 | Sridhara et al. | |
| 2011/0136507 A1 | 6/2011 | Hauser et al. | |
| 2011/0173545 A1 | 7/2011 | Meola | |
| 2011/0221745 A1 | 9/2011 | Golman et al. | |
| 2011/0231235 A1 | 9/2011 | MacIlwaine et al. | |
| 2011/0246148 A1 | 10/2011 | Gupta et al. | |
| 2011/0267369 A1 | 11/2011 | Olsen et al. | |
| 2012/0024947 A1 * | 2/2012 | Naelon | G06Q 30/06 235/380 |
| 2012/0069131 A1 | 3/2012 | Abelow | |
| 2012/0081250 A1 | 4/2012 | Farrokhi et al. | |
| 2012/0096490 A1 | 4/2012 | Barnes | |
| 2012/0166960 A1 | 6/2012 | Salles | |
| 2012/0172055 A1 | 7/2012 | Edge | |
| 2012/0179764 A1 | 7/2012 | Erdal | |
| 2012/0191497 A1 | 7/2012 | Patterson | |
| 2012/0197690 A1 | 8/2012 | Agulnek | |
| 2012/0197720 A1 | 8/2012 | Bezancon et al. | |
| 2012/0214515 A1 | 8/2012 | Davis et al. | |
| 2012/0239504 A1 | 9/2012 | Curlander et al. | |
| 2012/0270573 A1 | 10/2012 | Marti et al. | |
| 2012/0271691 A1 | 10/2012 | Hammad et al. | |
| 2012/0274642 A1 | 11/2012 | Ofek et al. | |
| 2012/0284117 A1 | 11/2012 | Karandikar | |
| 2013/0012235 A1 | 1/2013 | Burdo et al. | |
| 2013/0024203 A1 | 1/2013 | Flores et al. | |
| 2013/0024265 A1 | 1/2013 | Lotzof | |
| 2013/0030875 A1 | 1/2013 | Lee et al. | |
| 2013/0036455 A1 | 2/2013 | Bodi et al. | |
| 2013/0052990 A1 | 2/2013 | Zhang | |
| 2013/0059603 A1 | 3/2013 | Guenec et al. | |
| 2013/0073381 A1 | 3/2013 | Binkley | |
| 2013/0085834 A1 | 4/2013 | Witherspoon et al. | |
| 2013/0091452 A1 | 4/2013 | Sorden et al. | |
| 2013/0132230 A1 | 5/2013 | Gibson et al. | |
| 2013/0137464 A1 | 5/2013 | Kramer et al. | |
| 2013/0157655 A1 | 6/2013 | Smith et al. | |
| 2013/0158867 A1 | 6/2013 | Sidhu et al. | |
| 2013/0173377 A1 | 7/2013 | Keller et al. | |
| 2013/0173393 A1 | 7/2013 | Calman et al. | |
| 2013/0191213 A1 | 7/2013 | Beck et al. | |
| 2013/0225282 A1 | 8/2013 | Williams et al. | |
| 2013/0231135 A1 | 9/2013 | Garskof | |
| 2013/0267260 A1 | 10/2013 | Chao et al. | |
| 2013/0279543 A1 | 10/2013 | Torimoto et al. | |
| 2013/0281084 A1 | 10/2013 | Batada et al. | |
| 2013/0317944 A1 | 11/2013 | Huang et al. | |
| 2013/0339073 A1 | 12/2013 | Dabbiere | |
| 2014/0025466 A1 | 1/2014 | Borton et al. | |
| 2014/0058766 A1 | 2/2014 | Yu et al. | |
| 2014/0067544 A1 | 3/2014 | Klish et al. | |
| 2014/0073363 A1 | 3/2014 | Tidd et al. | |
| 2014/0074593 A1 | 3/2014 | Chomsky et al. | |
| 2014/0082509 A1 | 3/2014 | Roumeliotis et al. | |
| 2014/0118113 A1 | 5/2014 | Kaushik et al. | |
| 2014/0122040 A1 | 5/2014 | Marti | |
| 2014/0128103 A1 | 5/2014 | Joao et al. | |
| 2014/0129266 A1 | 5/2014 | Perl et al. | |
| 2014/0132772 A1 | 5/2014 | Billau et al. | |
| 2014/0162693 A1 | 6/2014 | Wachter et al. | |
| 2014/0164761 A1 | 6/2014 | Kufluk et al. | |
| 2014/0188614 A1 | 7/2014 | Badenhop | |
| 2014/0189802 A1 | 7/2014 | Montgomery | |
| 2014/0207509 A1 | 7/2014 | Yu et al. | |

(56) References Cited

U.S. PATENT DOCUMENTS

| | | |
|---|---|---|
| 2014/0228060 A1 | 8/2014 | Abhyanker |
| 2014/0237076 A1 | 8/2014 | Goldman et al. |
| 2014/0244332 A1 | 8/2014 | Mermelstein |
| 2014/0253383 A1 | 9/2014 | Rowitch |
| 2014/0256357 A1 | 9/2014 | Wang et al. |
| 2014/0257991 A1 | 9/2014 | Christensen et al. |
| 2014/0278054 A1 | 9/2014 | Tidd et al. |
| 2014/0292481 A1 | 10/2014 | Dumas et al. |
| 2014/0342760 A1 | 11/2014 | Moldavsky et al. |
| 2015/0028996 A1* | 1/2015 | Agrafioti .............. G06F 21/40 340/5.82 |
| 2015/0035644 A1* | 2/2015 | June .............. G07C 11/00 340/5.61 |
| 2015/0038171 A1 | 2/2015 | Uilecan et al. |
| 2015/0052460 A1 | 2/2015 | Mohammad Mirzaei et al. |
| 2015/0058133 A1* | 2/2015 | Roth .............. G06Q 30/0269 705/14.66 |
| 2015/0080014 A1 | 3/2015 | Ben-Yosef et al. |
| 2015/0081348 A1 | 3/2015 | Avera et al. |
| 2015/0100398 A1 | 4/2015 | Narayanaswami et al. |
| 2015/0112841 A1 | 4/2015 | Ivanovic et al. |
| 2015/0127445 A1 | 5/2015 | Jaffee |
| 2015/0154674 A1 | 6/2015 | Todasco |
| 2015/0176997 A1 | 6/2015 | Pursche et al. |
| 2015/0181384 A1 | 6/2015 | Mayor et al. |
| 2015/0222935 A1 | 8/2015 | King et al. |
| 2015/0229626 A1 | 8/2015 | Hauhn |
| 2015/0233715 A1 | 8/2015 | Xu et al. |
| 2015/0237473 A1 | 8/2015 | Koepke |
| 2015/0241238 A1 | 8/2015 | Bass |
| 2015/0242890 A1 | 8/2015 | Bass et al. |
| 2015/0244725 A1 | 8/2015 | Ziskind |
| 2015/0262086 A1 | 9/2015 | Mader et al. |
| 2015/0262216 A1 | 9/2015 | Aziz et al. |
| 2015/0294303 A1* | 10/2015 | Hanson .............. G06Q 20/346 235/379 |
| 2015/0296347 A1 | 10/2015 | Roth |
| 2015/0334569 A1 | 11/2015 | Rangarajan et al. |
| 2015/0334676 A1 | 11/2015 | Hart et al. |
| 2016/0005003 A1 | 1/2016 | Norris et al. |
| 2016/0050526 A1 | 2/2016 | Liu et al. |
| 2016/0063537 A1 | 3/2016 | Kumar |
| 2016/0078370 A1 | 3/2016 | McEwen et al. |
| 2016/0105644 A1 | 4/2016 | Smith et al. |
| 2016/0127351 A1 | 5/2016 | Smith et al. |
| 2016/0150370 A1 | 5/2016 | Gillespie et al. |
| 2016/0242010 A1 | 8/2016 | Parulski et al. |
| 2016/0286361 A1 | 9/2016 | Ciecko |
| 2016/0300192 A1 | 10/2016 | Zamer |
| 2016/0316324 A1 | 10/2016 | Sahadi |
| 2016/0321548 A1 | 11/2016 | Ziskind |
| 2016/0323708 A1 | 11/2016 | Sahadi |
| 2017/0010119 A1 | 1/2017 | Bass |
| 2017/0011348 A1 | 1/2017 | Ziskind |
| 2017/0161720 A1* | 6/2017 | Xing .............. G06Q 20/3278 |
| 2017/0162006 A1 | 6/2017 | Sahadi |
| 2017/0169449 A1 | 6/2017 | Heaven et al. |
| 2017/0237820 A1 | 8/2017 | Scarborough et al. |
| 2017/0248438 A1 | 8/2017 | Bass |
| 2017/0372270 A1 | 12/2017 | Ziskind |
| 2018/0124559 A1 | 5/2018 | Sahadi |
| 2018/0192248 A1 | 7/2018 | Sahadi |

FOREIGN PATENT DOCUMENTS

| | | |
|---|---|---|
| WO | WO 2011/159811 | 12/2011 |
| WO | WO 2013/163444 | 10/2013 |
| WO | WO 2015/017442 | 2/2015 |
| WO | WO 2015/130969 | 9/2015 |
| WO | WO 2015/130971 | 9/2015 |
| WO | WO 2016/172731 | 10/2016 |
| WO | WO 2016/176506 | 11/2016 |
| WO | WO 2016/179098 | 11/2016 |
| WO | WO 2017/100801 | 6/2017 |

OTHER PUBLICATIONS

U.S. Appl. No. 15/597,609 Office Action dated Jul. 10, 2017.
U.S. Appl. No. 14/632,884 Office Action dated May 19, 2017.
PCT Application No. PCT/US2016/067582, International Search Report and Written Opinion dated Mar. 17, 2017.
U.S. Appl. No. 14/633,015 Office Action dated Apr. 13, 2017.
U.S. Appl. No. 15/138,157 Office Action dated Mar. 9, 2017.
U.S. Appl. No. 15/144,359 Office Action dated Apr. 5, 2017.
Feng et al., Yue ; "Effective venue image retrieval using robust feature extraction and model constrained matching for mobile robot localization", Machine Vision and Applications, DOI 10.1007/s00138-011-0350-z, Oct. 28, 2010.
Krueger, Robert; Thom, Dennis; Ertl, Thomas; "Visual Analysis of Movement Behavior using Web Data for Context Enrichment" Institute for Visualization and Interactive Systems (VIS), Published in *Pacific Visualization Symposium (PacificVis), 2014 IEEE*, pp. 193-200.IEEE, 2014.
Sim, Robert; Dudek, Gregory; "Effective Exploration Strategies for the Construction of Visual Maps", Centre for Intelligent Machines, Published in: Intelligent Robots and Systems, 2003. (IROS 2003). Proceedings. 2003 IEEE/RSJ International Conference on (vol. 4) Date of Conference: Oct. 27-31, 2003.
PCT Application No. PCT/US2004/12667, International Search Report dated Oct. 29, 2004.
PCT Application No. PCT/US2015/017827, International Search Report and Written Opinion dated Jun. 11, 2015.
PCT Application No. PCT/US2015/017829, International Search Report and Written Opinion dated Jun. 8, 2015.
PCT Application No. PCT/US2016/029260, International Search Report and Written Opinion dated Jul. 27, 2016.
PCT Application No. PCT/US2016/029880, International Search Report and Written Opinion dated Jul. 27, 2016.
PCT Application No. PCT/US2016/030424, International Search Report and Written Opinion dated Jul. 29, 2016.
U.S. Appl. No. 14/632,872 Office Action dated Mar. 7, 2016.
U.S. Appl. No. 14/633,019 Final Office Action dated Nov. 10, 2016.
U.S. Appl. No. 14/633,019 Office Action dated May 6, 2016.
U.S. Appl. No. 14/632,884 Final Office Action dated Dec. 1, 2017.
European Patent Application 15754659.9 Extended European Search Report dated Sep. 29, 2017.
U.S. Appl. No. 14/632,884 Office Action dated Apr. 2, 2018.
U.S. Appl. No. 15/805,014 Office Action dated Apr. 5, 2018.
U.S. Appl. No. 14/633,015 Final Office Action dated Dec. 28, 2017.
U.S. Appl. No. 15/683,620 Office Action dated Feb. 22, 2018.
U.S. Appl. No. 15/906,285 Office Action dated May 9, 2018.
U.S. Appl. No. 14/633,015 Office Action dated Jun. 25, 2018.
Testa et al., Leonard; "Evolving Efficient Theme Parks Tours", Journal of Computing and Info Tech-CIT 7, 1999, 1, 77-92.
U.S. Appl. No. 15/141,780 Office Action dated Oct. 1, 2018.

* cited by examiner

WEARABLE DEVICE

CROSS-REFERENCE TO RELATED APPLICATIONS

The present application claims the priority benefit of U.S. provisional application No. 62/264,266 filed Dec. 7, 2015 and entitled "Wearable Device," which is hereby incorporated by reference.

BACKGROUND

1. Field of the Invention

The present invention generally relates to wearable devices. The present invention more specifically relates to a wearable device that may be utilized in an entertainment venue.

2. Description of the Related Art

Entertainment venues such as theme parks, cruise ships, universities, arenas, resorts, and stadiums are a popular family attractions that host thousands of people. Most venues hosting these events provide static paper maps or signs that allow guests to explore the venue, encourage engagement in one or more activities at the venue, and otherwise attempt to maximize enjoyment while on the premises. The venues often have special events such as concerts, merchandise, culinary, or souvenir sales, and other limited time or new events that are often of interest to their visitors. It is difficult, if not impossible, to track and communicate with visitors concerning these special events when they are only provided with a single static means of communication. Similar challenges exists for visitors to communicate amongst themselves, especially concerning their past, present, and intended future location and plans such as when and where to meet with one another.

There is a need in the art for improved customer communications. Such an improvement is needed such that venues might the overall user experience, better engage with and service customers, track customer needs, and ultimately improve monetization from the user presence at the venue. These communications are needed, specifically, in the context of a device that is omni-present and non-obtrusive.

SUMMARY OF THE PRESENTLY CLAIMED INVENTION

A first claimed embodiment of the present invention concerns a system for interactivity with a guest in a venue. The system includes one or more guest information servers storing guest information. The system also includes a wearable device. The wearable device includes a memory storing a unique identification code, wherein the unique identification code corresponds to the guest information stored at the one or more guest information servers. The wearable device includes a wireless communication interface to provide the unique identification code to a venue sensor located within the venue, thereby providing a venue device with access to the guest information stored at the one or more guest information servers, the venue device communicatively coupled to the venue sensor. The wearable device also includes a light source, the light source indicating a status of the wearable device.

A second claimed embodiment of the present invention concerns a wearable device for interactivity with a guest in a venue. The wearable device includes a memory storing a unique identification code. The wearable device also includes a wireless communication interface to provide the unique identification code to a venue sensor located within the venue. The wearable device also includes a light source, the light source indicating a status of the wearable device.

A third-claimed embodiment of the present invention concerns a method of interactivity with a guest in a venue. The method includes storing a unique identification code within a memory of a wearable device associated with the guest, wherein the unique identification code corresponds to guest information stored at one or more guest information servers. The method also includes providing the unique identification code from the wearable device to a venue sensor via a wireless communication interface of the wearable device, thereby providing a venue device with access to the guest information stored at the one or more guest information servers, the venue device communicatively coupled to the venue sensor. The method also includes emitting light from a light source, the light indicating a status of the wearable device.

DETAILED DESCRIPTION

A wearable device associated with a guest in a venue stores a unique identification code. The unique identification code may correspond to guest information stored at one or more guest information servers. The guest information may include ticket information, room entitlements, vouchers, payment information, credit card information, or folio information. The wearable device transmits unique identification code to a venue scanner associated with a venue device. The venue device may obtain access to at least some of the guest information based on receipt of the unique identification code. The wearable device also includes a light source that may indicate a status of the guest or of the wearable device based on the colors and/or the blinking patterns emitted by the light source. The light source may, for example, indicate a guest's access permissions to portions of the venue.

Figure 1:
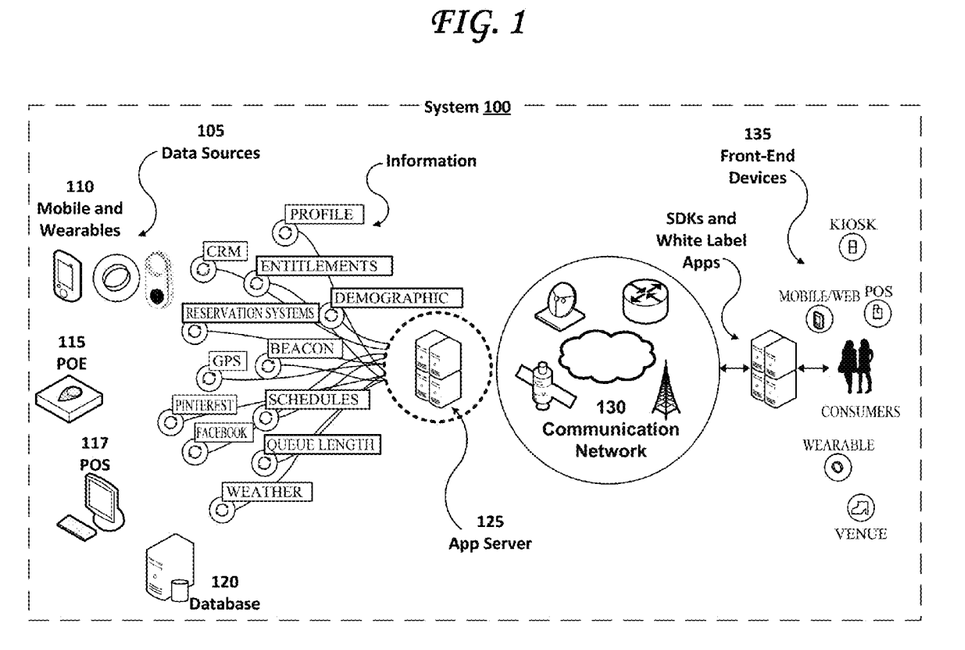
FIG. 1 illustrates a system for increasing customer engagement, including customer monetization.

FIG. 1 illustrates a system 100 for increasing customer engagement, including customer monetization. The system 100 of FIG. 1 includes an ecosystem of data sources 105 such as mobile devices 110, point-of-sale (POS) terminals 117, point-of-entry/-exit (POE) terminals 115, and databases 120. Communicatively coupled to data sources 105 are back-end application servers 125. In system 100, application servers 125 can ingest, normalize and process data collected from mobile devices 110 and various POS or POE terminals 115. Types of information gathered from data sources 105 and processed by back-end application servers 125 are generally inclusive of identity (e.g., user profiles, CRM data, entitlements, demographics, reservation systems and social media sources like Pinterest and Facebook), proximity (e.g., GPS and beacons), and time (e.g., schedules, weather, and queue length).

Mobile devices 110 can execute an application on a user mobile device that shares customer engagement data such as current and prior physical locale within a venue as well as wait times and travel times (e.g., how long was a customer at a particular point in a venue and how long did it take the customer to travel to a further point in a venue). Mobile devices 110 are inclusive of wearable devices. Wearable devices (or 'wearables') are any type of mobile electronic device that can be worn on the body or attached to or embedded in clothes and accessories of an individual. Processors and sensors associated with a wearable can gather, process, display, and transmit and receive information.

POS data may be gathered at a POS terminal 117 that may interact with a mobile or wearable device 110 to track customer purchase history at a venue or preference for engagement at a particular locale within the venue. POE terminals 115 may provide data related to venue traffic flow, including entry and exit data that can be inclusive of time and volume. POE terminals 115 may likewise interact with mobile and wearable devices 110.

Historical data may also be accessed at databases 120 as a part of the application server 125 processing operation. The results of a processing or normalization operation may likewise be stored for later access and use. Processing and normalization results may also be delivered to front-end applications (and corresponding application servers) that allow for the deployment of contextual experiences and provide a network of services to remote devices as is further described herein.

The present system 100 may be used with and communicate with any number of external front-end devices 135 by way of communications network 130. Communication network 130 may be a local, proprietary network (e.g., an intranet) and/or may be a part of a larger wide-area network. Communication network 130 may include a variety of connected computing device that provide one or more elements of a network-based service. The communications network 130 may include actual server hardware or virtual hardware simulated by software running on one or more actual machines thereby allowing for software controlled scaling in a cloud environment.

Communication network 130 allows for communication between data sources 105 and front-end devices 135 via any number of various communication paths or channels that collectively make up network 130. Such paths and channels may operate utilizing any number of standards or protocols including TCP/IP, 802.11, Bluetooth, GSM, GPRS, 4G, and LTE. Communications network 130 may be a local area network (LAN) that can be communicatively coupled to a wide area network (WAN) such as the Internet operating through one or more network service provider.

Information received and provided over communications network 130 may come from other information systems such as the global positioning system (GPS), cellular service providers, or third-party service providers such as social networks. The system 100 can measure location and proximity using hardware on a user device (e.g., GPS) or collect the data from fixed hardware and infrastructure such as Wi-Fi positioning systems and Radio Frequency ID (RFID) readers. An exemplary location and proximity implementation may include a Bluetooth low-energy beacon with real time proximity detection that can be correlated to latitude/longitude measurements for fixed beacon locations.

Additional use cases may include phone-based, GPS, real-time location (latitude/longitude) measurements, phone geo-fence-real time notifications when a device is moving into or out of location regions, Wi-Fi positioning involving user location detection based on Wi-Fi signal strength (both active or passive), RFID/Near Field Communication (NFC), and cellular tower positioning involving wide range detection of user device location, which may occur at the metro-level.

Front-end devices 135 are inclusive of kiosks, mobile devices, wearable devices, venue devices, captive portals, digital signs, and POS and POE devices. It should be noted that each of these external devices may be used to gather information about one or more consumers at a particular location during a particular time. Thus, a device that is providing information to a customer on the front-end (i.e., a front-end device 135) such as a mobile device executing an application or a specially designed wearable can also function as a data source 105 as described above.

The system 100 of FIG. 1 provides services to connect venue management with visitors and entertainment consumers while simultaneously providing a messaging platform for consumers. For example, the social network of a consumer may be extended into a map and the physical world associated with the map. Services to extend the social network of a user include finding friends, coordinating rally points, management of proximity based parental controls, serendipitous discovery, and customization and sharing of photos. Venue management may provision consumers with badges, points and rewards, coordinate scavenger hunts and competitions, and provide leaderboard and trivia services. Consumers may also be engaged by collecting feedback and reviews of their experiences, managing favorites and wish lists, conducting surveys and interactive voting, and through the display of messages.

Figure 2:
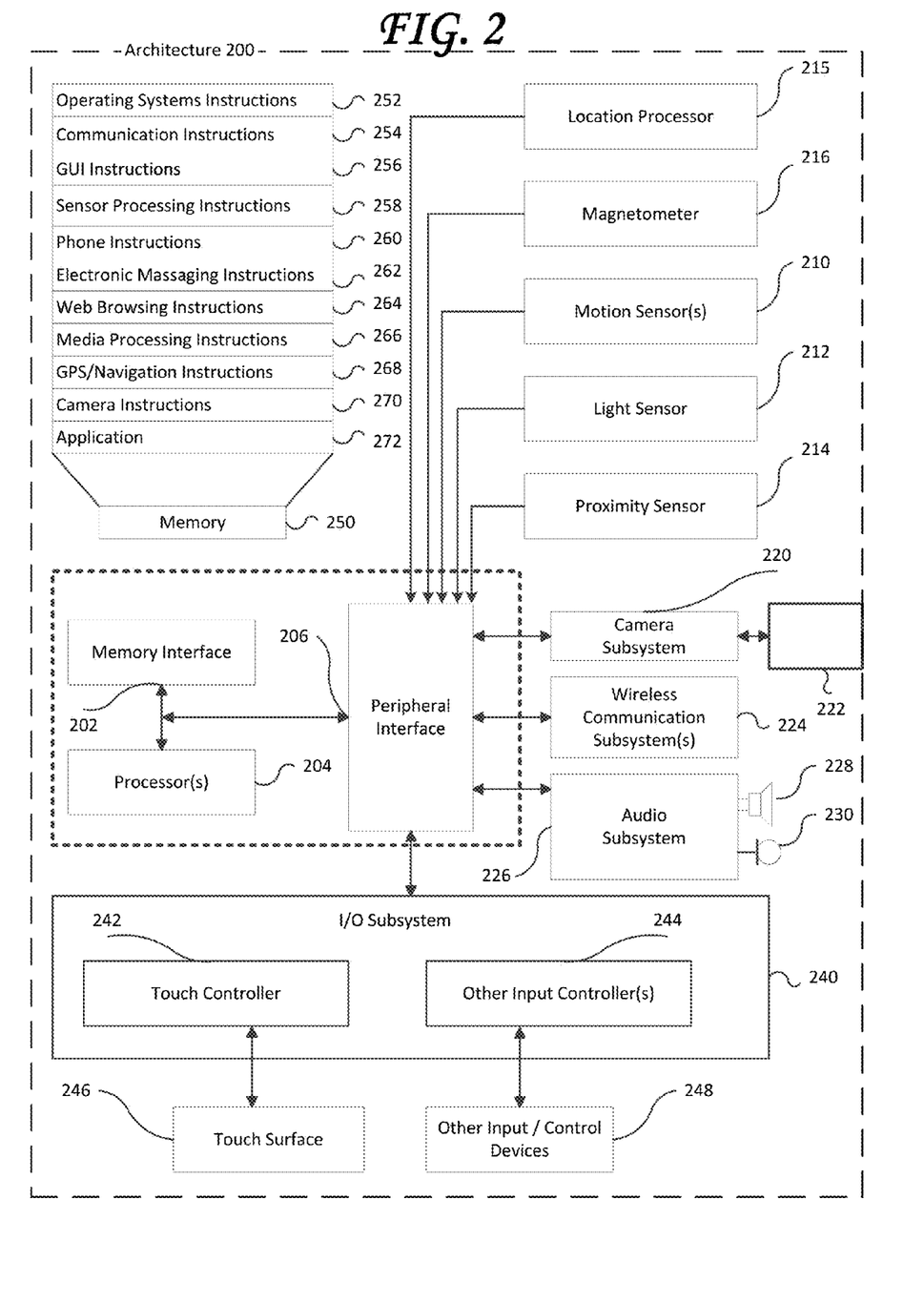
FIG. 2 illustrates a mobile device architecture that may be utilized to implement various features and processes described herein.

FIG. 2 illustrates a mobile device architecture that may be utilized to implement the various features and processes described herein, such as a wearable device 110 or a venue device that communicates with the wearable device 110. Architecture 200 can be implemented in any number of portable devices including but not limited to smart phones, electronic tablets, and gaming devices. Architecture 200 may also be implemented as a wearable device.

Wearable technology includes mobile electronic devices that can be worn on the body or attached to or embedded in clothes and accessories of an individual. The designs of wearable technology often incorporate practical functions and features, but may also have a purely critical or aesthetic agenda. Processors and sensors associated with the wearable technology can gather, process, and display information to a user. Examples of wearable technology in the health arena include the FitBit, the Nike Fuel Band, and the Apple Watch. Any number of form factors, including branded form factors, are possible.

Architecture 200 as illustrated in FIG. 2 includes memory interface 202, processors 204, and peripheral interface 206. Memory interface 202, processors 204 and peripherals interface 206 can be separate components or can be integrated as a part of one or more integrated circuits. The various components can be coupled by one or more communication buses or signal lines.

Processors 204 as illustrated in FIG. 2 is meant to be inclusive of data processors, image processors, central processing unit, or any variety of multi-core processing devices. Any variety of sensors, external devices, and external subsystems can be coupled to peripherals interface 206 to facilitate any number of functionalities within the architecture 200 of the exemplar mobile device. For example, motion sensor 210, light sensor 212, and proximity sensor 214 can be coupled to peripherals interface 206 to facilitate orientation, lighting, and proximity functions of the mobile device. For example, light sensor 212 could be utilized to facilitate adjusting the brightness of touch surface 246. Motion sensor 210, which could be exemplified in the context of an accelerometer or gyroscope, could be utilized to detect movement and orientation of the mobile device. Display objects or media could then be presented according to a detected orientation (e.g., portrait or landscape).

Other sensors could be coupled to peripherals interface 206, such as a temperature sensor, a biometric sensor, or other sensing device to facilitate corresponding functionalities. Location processor 215 (e.g., a global positioning transceiver) can be coupled to peripherals interface 206 to allow for generation of geo-location data thereby facilitating geo-positioning. An electronic magnetometer 216 such as an integrated circuit chip could in turn be connected to peripherals interface 206 to provide data related to the direction of true magnetic North whereby the mobile device could enjoy compass or directional functionality. Camera subsystem 220 and an optical sensor 222 such as a charged coupled device (CCD) or a complementary metal-oxide semiconductor (CMOS) optical sensor can facilitate camera functions such as recording photographs and video clips.

Communication functionality can be facilitated through one or more communication subsystems 224, which may include one or more wireless communication subsystems. Wireless communication subsystems 224 can include 802.x, near field communication (NFC), RFID (radio frequency identification), or Bluetooth transceivers as well as optical transceivers such as infrared. Wired communication system can include a port device such as a Universal Serial Bus (USB) port or some other wired port connection that can be used to establish a wired coupling to other computing devices such as network access devices, personal computers, printers, displays, or other processing devices capable of receiving or transmitting data. The specific design and implementation of communication subsystem 224 may depend on the communication network or medium over which the device is intended to operate. For example, a device may include wireless communication subsystem designed to operate over a global system for mobile communications (GSM) network, a GPRS network, an enhanced data GSM environment (EDGE) network, 802.x communication networks, NFC terminals, code division multiple access (CDMA) networks, or RFID or Bluetooth networks. Communication subsystem 224 may include hosting protocols such that the device may be configured as a base station for other wireless devices. Communication subsystems can also allow the device to synchronize with a host device using one or more protocols such as TCP/IP, HTTP, or UDP.

Audio subsystem 226 can be coupled to a speaker 228 and one or more microphones 230 to facilitate voice-enabled functions. These functions might include voice recognition, voice replication, or digital recording. Audio subsystem 226 in conjunction may also encompass traditional telephony functions.

I/O subsystem 240 may include touch controller 242 and/or other input controller(s) 244. Touch controller 242 can be coupled to a touch surface 246. Touch surface 246 and touch controller 242 may detect contact and movement or break thereof using any of a number of touch sensitivity technologies, including but not limited to capacitive, resistive, infrared, or surface acoustic wave technologies. Other proximity sensor arrays or elements for determining one or more points of contact with touch surface 246 may likewise be utilized. In one implementation, touch surface 246 can display virtual or soft buttons and a virtual keyboard, which can be used as an input/output device by the user.

Other input controllers 244 can be coupled to other input/control devices 248 such as one or more buttons, rocker switches, thumb-wheels, infrared ports, USB ports, and/or a pointer device such as a stylus. The one or more buttons (not shown) can include an up/down button for volume control of speaker 228 and/or microphone 230. In some implementations, device architecture 200 can include the functionality of an audio and/or video playback or recording device and may include a pin connector for tethering to other devices.

Memory interface 202 can be coupled to memory 250. Memory 250 can include high-speed random access memory or non-volatile memory such as magnetic disk storage devices, optical storage devices, or flash memory. Memory 250 can store operating system 252, such as Darwin, RTXC, LINUX, UNIX, OS X, ANDROID, WINDOWS, or an embedded operating system such as VxWorks. Operating system 252 may include instructions for handling basic system services and for performing hardware dependent tasks. In some implementations, operating system 252 can include a kernel.

Memory 250 may also store communication instructions 254 to facilitate communicating with other mobile computing devices or servers. Communication instructions 254 can also be used to select an operational mode or communication medium for use by the device based on a geographic location, which could be obtained by the GPS/Navigation instructions 268. Memory 250 may include graphical user interface instructions 256 to facilitate graphic user interface processing such as the generation of an interface; sensor processing instructions 258 to facilitate sensor-related processing and functions; phone instructions 260 to facilitate phone-related processes and functions; electronic messaging instructions 262 to facilitate electronic-messaging related processes and functions; web browsing instructions 264 to facilitate web browsing-related processes and functions; media processing instructions 266 to facilitate media processing-related processes and functions; GPS/Navigation instructions 268 to facilitate GPS and navigation-related processes, camera instructions 270 to facilitate camera-related processes and functions; and instructions 272 for any other application that may be operating on or in conjunction with the mobile computing device. Memory 250 may also store other software instructions for facilitating other processes, features and applications, such as applications related to navigation, social networking, location-based services or map displays.

Each of the above identified instructions and applications can correspond to a set of instructions for performing one or more functions described above. These instructions need not be implemented as separate software programs, procedures, or modules. Memory 250 can include additional or fewer instructions. Furthermore, various functions of the mobile device may be implemented in hardware and/or in software, including in one or more signal processing and/or application specific integrated circuits.

Certain features may be implemented in a computer system that includes a back-end component, such as a data server, that includes a middleware component, such as an application server or an Internet server, or that includes a front-end component, such as a client computer having a graphical user interface or an Internet browser, or any combination of the foregoing. The components of the system can be connected by any form or medium of digital data communication such as a communication network. Some examples of communication networks include LAN, WAN and the computers and networks forming the Internet. The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments may be implemented using an API that can define on or more parameters that are passed between a calling application and other software code such as an operating system, library routine, function that provides a service, that provides data, or that performs an operation or a computation. The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API. In some implementations, an API call can report to an application the capabilities of a device running the application, such as input capability, output capability, processing capability, power capability, and communications capability.

The wearable device encompassing the architecture 200 of FIG. 2 may be issued to every customer or entrant to a particular entertainment venue. The device could have multiple form factors such as a wristband, armband, or leg band as well as be attached to clothing by way of a clasp, snap, loop, or pin. The wearable device encompassing the architecture 200 of FIG. 2 should be able to interact with various venue sensors, venue terminals, or venue access points throughout a venue by way of Bluetooth, Near Field Communication (NFC), Radio Frequency Identification (RFID), Visible Light Communication (VLC), infrared communication, or some combination thereof. The architecture 200 of the wearable device may include one or more light sources (for example, LEDs) to indicate a status. Each light source may include one or more lights that may light up either alone or as a part of a larger and sometimes multi-colored light array.

The wearable device may include a wearable device that may be permanent, replaceable, or rechargeable. To help conserve power in said device, the architecture 200 of FIG. 2 that is integrated into the device may include a switch or other input or interface (e.g., a touch screen) to allow for power management. Said management functionality could also occur automatically in response to certain user activity such as connecting a circuit in the device when a clasp is closed or the device is connected to an article of clothing. Status of the battery may be reflected on a display component. Display may further reflect whether the device is or is capable of being paired to a mobile phone or a user account, which may include a social media account. Account may further include financial data or financial account information (e.g., real money or user credits). Architecture 200 may also include a haptic module to provide physical feedback to a user that may be related to notices and messaging, activity (e.g., account transactions), pairing with another device, or battery status.

Device may be assigned a unique code or identification number to identify the device as it communicates with sensors or other access points throughout a venue. Such communication may occur through cellular, NFC, RFID, VLC, Bluetooth, or wireless interactions. Interactions may further be correlated to one of the aforementioned user accounts, which indicates whether a customer or user of the wearable has certain entitlements such as tickets, rooms, and vouchers as well as payment methods including credit cards or a folio. The user account can be paired to venue specific guest account. This data may be cloud based.

Device interacts with readers or terminals throughout a venue either based on direct interaction or proximity based interactions that may be transparent for the actual wearer of the wearable device. Readers and terminals may be portable like those carried by a venue staff member, can be permanent such as at the entry to a particular portion of a venue or could be attached to a moveable object such as a vehicle that is traversing the venue.

The aforementioned light array may, following an interaction or exchange with a terminal or reader, indicate whether a user has been authorized for access to a locale, interaction with certain aspects of the locale, or grants of entitlements such as tickets. These entitlements or grants of access can be constantly updated and verified as a user moves throughout a venue. The lighting may allow for those charged with security or control of the venue to readily check the status of a user. For example, red lights may indicate a denial of access whereas a green light may indicate permitted access. Such a lighting system not only allows venue management to check the status of users but may also allow authorized attendees for the venue to police one another.

The wearable device may incorporate a digital map like that disclosed in U.S. patent application Ser. No. 14/632,872 and entitled "Live Branded Dynamic Mapping," the disclosure of which is incorporated herein by reference. A digital map be coupled to or in communication with an administrative console or mobile application managed by the staff of a venue. Venue management can thus track individual users based on the location of a wearable as well as status of their account and their device (e.g., operational status). Using the map, locale of other venue goers may be indicated to those goers, which may be related to a social account or a pre-venue implemented list of users with whom account and/or locale information is to be shared. Icons for venue attendees may also indicate the permission levels of that user and whether they are allowed to be in a given venue. Device status can also be tracked with respect to providing reminders or information concerning battery life, device status (e.g., functioning or malfunctioning), or pairing status.

Wearable devices as described herein can also allow for fraud prevention and identification of expired or invalid entitlements. To prevent fraud by having guests utilize counterfeit lights, each reader can instruct each wearable to light up with a different color and blinking pattern. The color/blink pattern can be managed centrally or by staff within the venue monitoring the area around the reader. Venue staff carrying a portable readers can move through the venue activating the lights of all wearables in proximity. This can enable random spot checking for entitlements.

To extend the battery life of the wearable, the wearable lights can be off by default while within the venue and will only turn on in the proximity of a reader. Each reader can tell the wearable when and for how long the light should be turned on to give enough time for venue staff to be able to visually validate the status of each wearable.

Guests can have their wearable device configured to light in different colors to signify status in loyalty programs or progress in games. Staff can use readers to command wearable devices to light in specific patterns and colors to create visual effects within a large area like a stadium. Wearable devices can communicate wirelessly with others in proximity to enable a number of use cases such as identifying when a nearby wearable does not have entitlements by blinking to enable guests to police themselves and synchronization of lighting effects (as mentioned above) between nearby wearable devices.

Other user cases include the development of a user profile based on passive observation. For example, a device can be trained as to a particular user behavior (blood pressure or gait, for example) and then user that information to determine if the device is being worn by someone else that is not authorized to access device entitlements. The device can also be used to locate other members of a party, to allow for venue access, to check location traffic—check ins and check outs—which can also be correlated to identity theft when the device reflects that a user is not present a particular financial transaction or POS terminal. Biometric information may be coupled to the device as well as device pairing, which may require the presence of the device and a secondary and trusted device such as a mobile phone to allow for certain transactions. Such pairing could also be coupled with biometric data to allow for seamless and transparent two-factor identification. Presence in user clusters may allow for a third-factor such as proximity to friends and family. Removal of the device from a user or from a cluster may terminate access to services or levels of services or certain accounts such as financial.

Devices may also be used to announce user presence and information about a user such as room presence, VIP status, food allergies, and the like. Devices could also allow for access to funds or credits in a gaming establishment such as a casino or be integrated with third-party services that might be a part of a user experience such as flower delivery to a hotel or taxi/limo service for a particular user. Automated check in could also be implemented using a device. A device could also be used to allow for virtual queuing where a persona takes a place in line before every being physically present in the line.

The device may also be used to allow for recommendations based on group experiences for large venues and then individually for small venues/individual experiences. The wearable devices can, through observation of profile data, identify particular user preferences and create groups or identify groups without the awkwardness of a user vocally announcing their desire to be a part of or not a part of a particular group or outing. Devices can also be used to identify leaders and followers based on individual behavior and then behavior of others that are or are not affiliated with a particular user and device.

Figure 3:
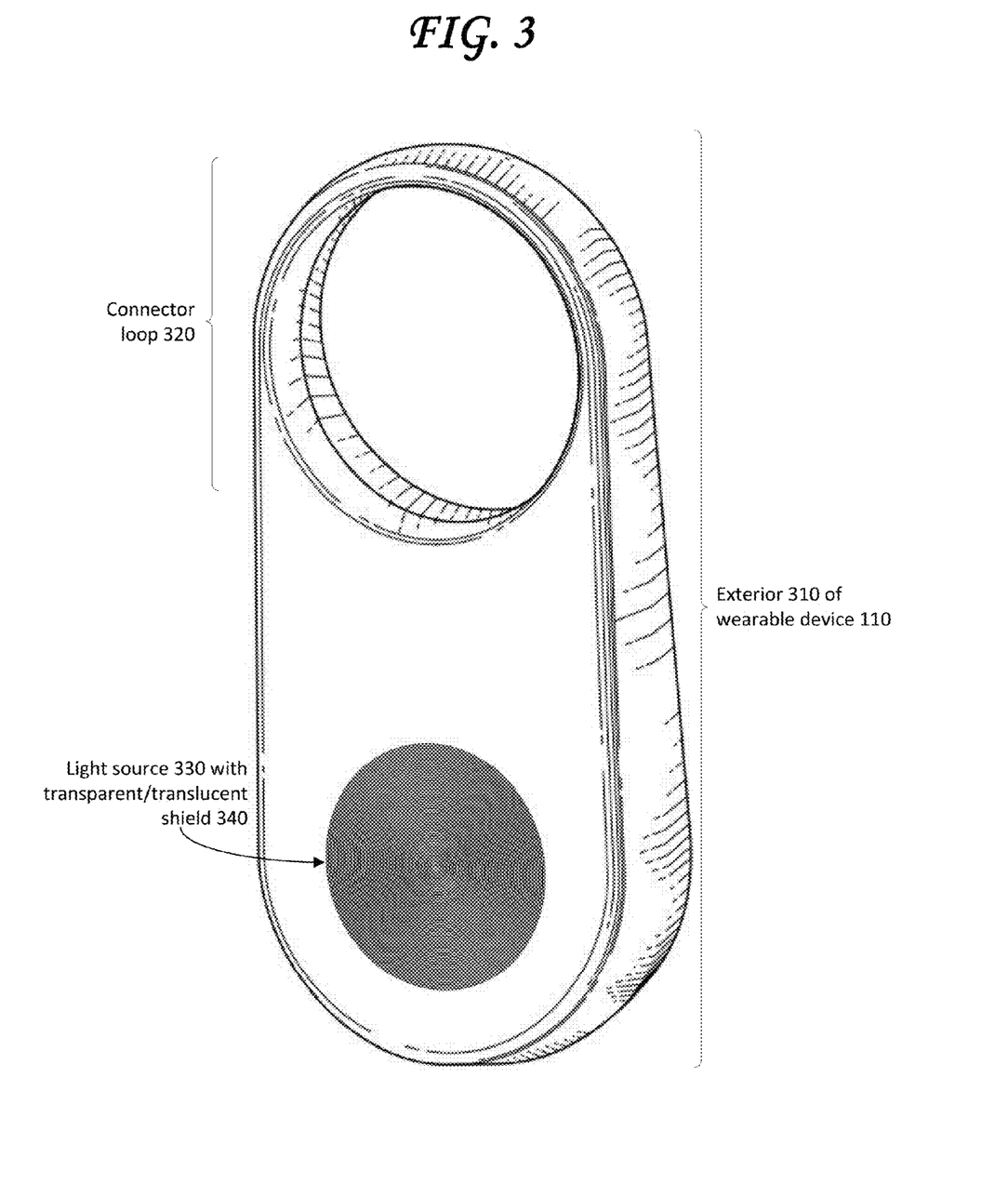
FIG. 3 illustrates a wearable device with a thinly textured circular light source shield and a circular connector loop.

FIG. 3 illustrates a wearable device with a thinly textured circular light source shield and a circular connector loop.

The exterior 310 of the wearable device 210 of FIG. 3 is illustrated as substantially rounded rectangular shape when seen from the front face. The connector loop 320 of FIG. 3 is circular and may further include or connect to a snap, clasp, or pin. The connector loop 320 may be attached to an article of clothing worn by a guest, for example.

The light source 330 of FIG. 3 is illustrated as being hidden behind a transparent or translucent light source shield 340, which may for example be made of plastic or glass and may act in some cases as a lens to focus, refract, reflect, or diffract light emitted by the light source located inside the wearable device 110 and behind the light source shield 340. The light source shield 340 of FIG. 3 is circular in shape.

In some cases, a communication interface of the wireless communication subsystem 124, such as an antenna, can also be hidden behind the transparent or translucent light source shield 340 to prevent wireless signal blockage by other portions of the exterior 310 of the wearable device 110, which may be opaque rather than transparent/translucent in some cases. In some cases, the wireless communication subsystem 124 may use the light source as a communication interface by using Visible Light Communication (VLC) protocols to communicate information, such as the unique identifier, to the venue sensor and thereby to the venue terminal. The light source shield 340 of FIG. 3 is textured with many thin circular lines.

It should be understood that, while the light source 330 may be located behind the illustrated light source shield 340 of FIG. 3, the light source may alternately or additionally be located anywhere else within the wearable device 110, such as higher up in the body or within the connector loop 320. Any or all of these portions of the exterior 310 of the wearable device 110 may be transparent or translucent to aid in the emission of light from the light source 330, and the light source shield 340 may be relocated to any of these portions of the exterior 310 of the wearable device 110. Likewise, the communication interface of the wireless communication subsystem 124 may also be located anywhere within the wearable device 110.

Figure 4:
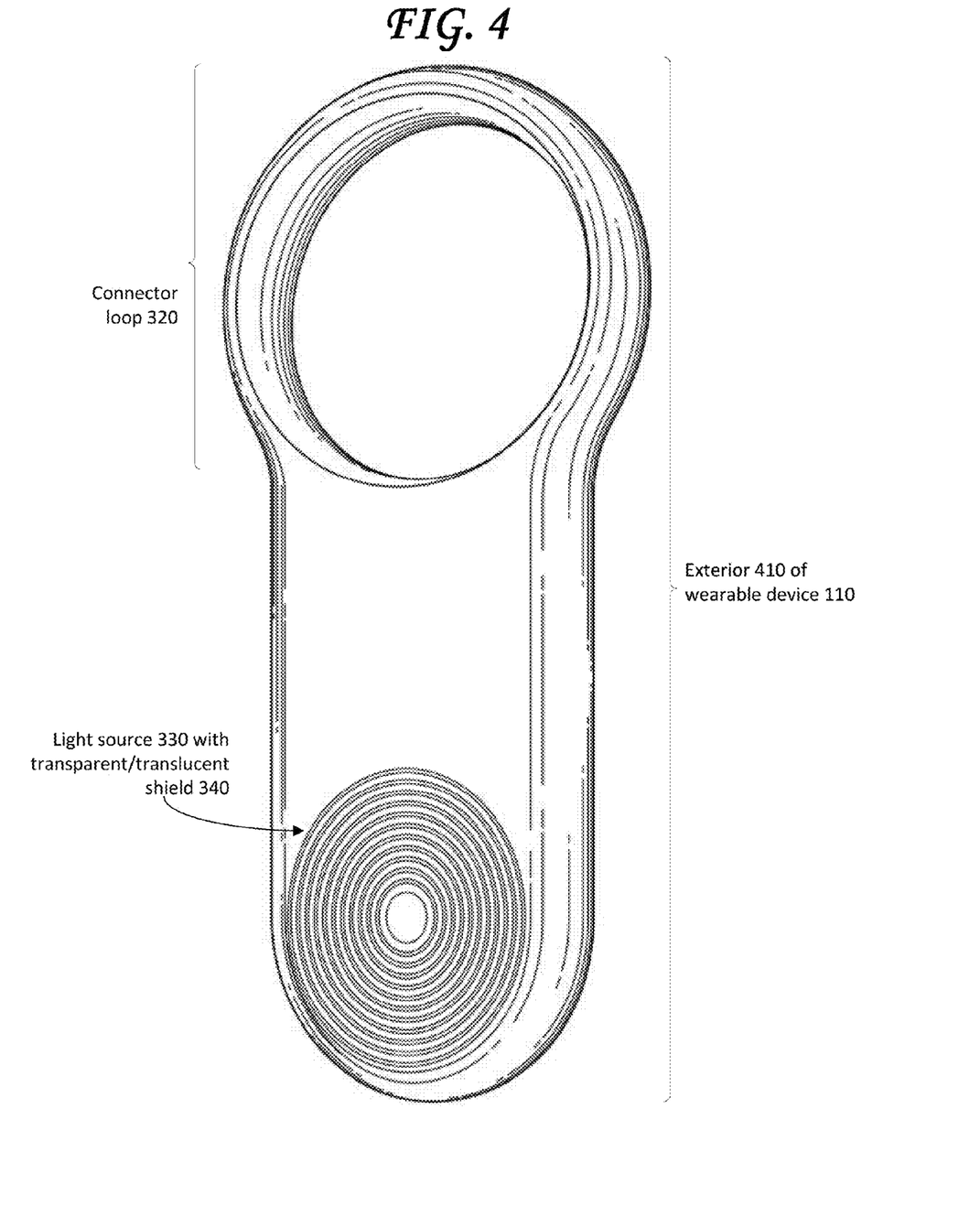
FIG. 4 illustrates a wearable device with a thickly textured circular light source shield and a large circular connector loop.

FIG. 4 illustrates a wearable device with a thickly textured circular light source shield and a large circular connector loop.

The wearable device 110 of FIG. 4 includes an exterior 410 that also has a substantially rounded rectangular shape when seen from the front face, though the connector loop 320 of FIG. 4 is a large enough circle to modify the shape of the exterior 310 on the end it is on. The light source shield 340 of FIG. 4 is textured with circular lines, though the lines are thicker than those texturing the light source shield 340 of FIG. 3, and there are not as many of them.

Figure 5:
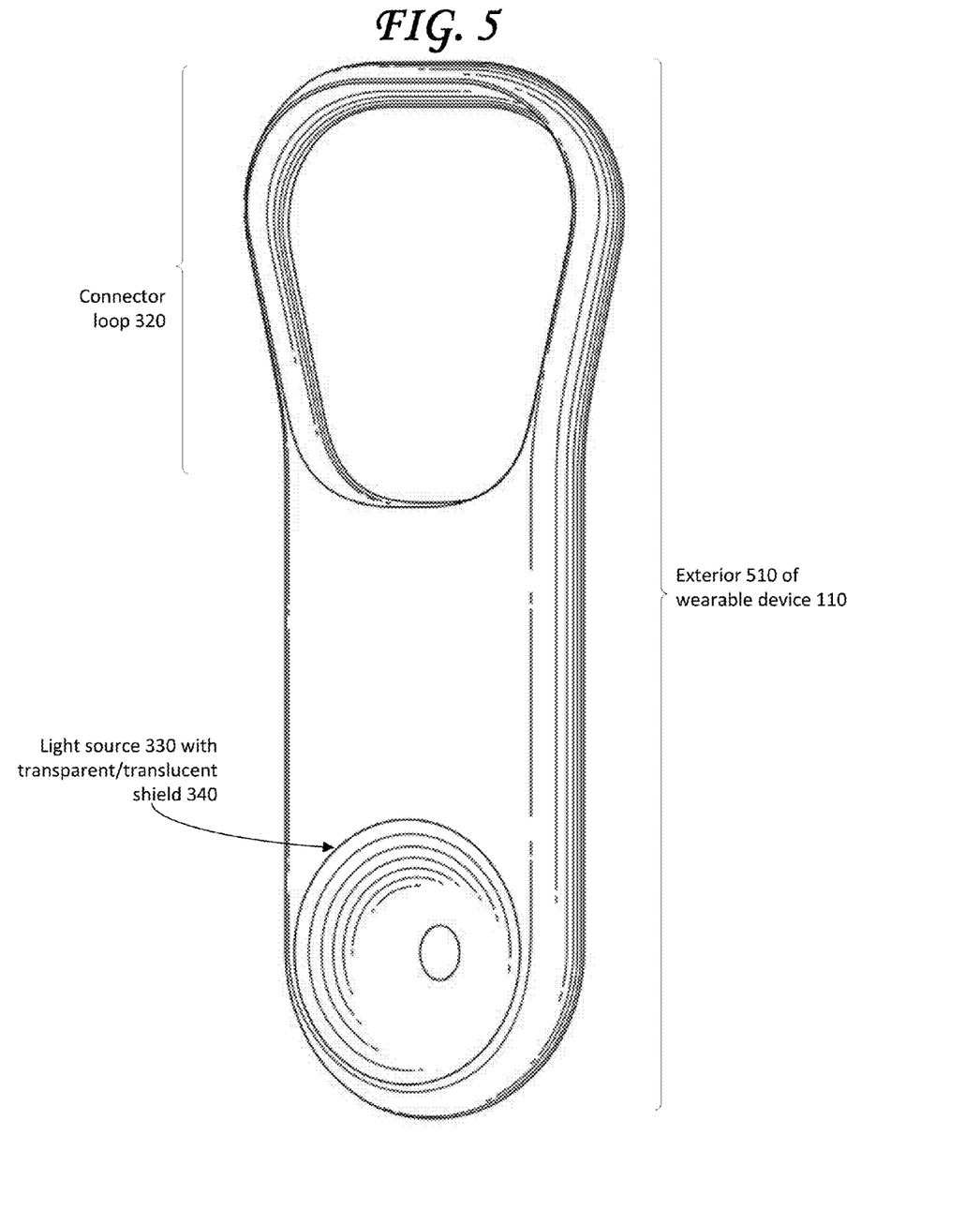
FIG. 5 illustrates a wearable device with a concave light source shield and a large rounded trapezoidal connector loop.

FIG. 5 illustrates a wearable device with a concave light source shield and a large rounded trapezoidal connector loop.

The wearable device 110 of FIG. 5 includes an exterior 510 that also has a substantially rounded rectangular shape when seen from the front face, though the connector loop 320 of FIG. 5 is a large enough rounded trapezoid to modify the shape of the exterior 310 on the end it is on. The light source shield 340 of FIG. 5 is concave, which may affect the light coming from the light source 330, for example by causing the light to diverge. An alternate wearable device 110 (not pictured) might instead include a convex light source shield 340, which could instead cause the light from the light source 330 to focus to a focal point.

Figure 6:
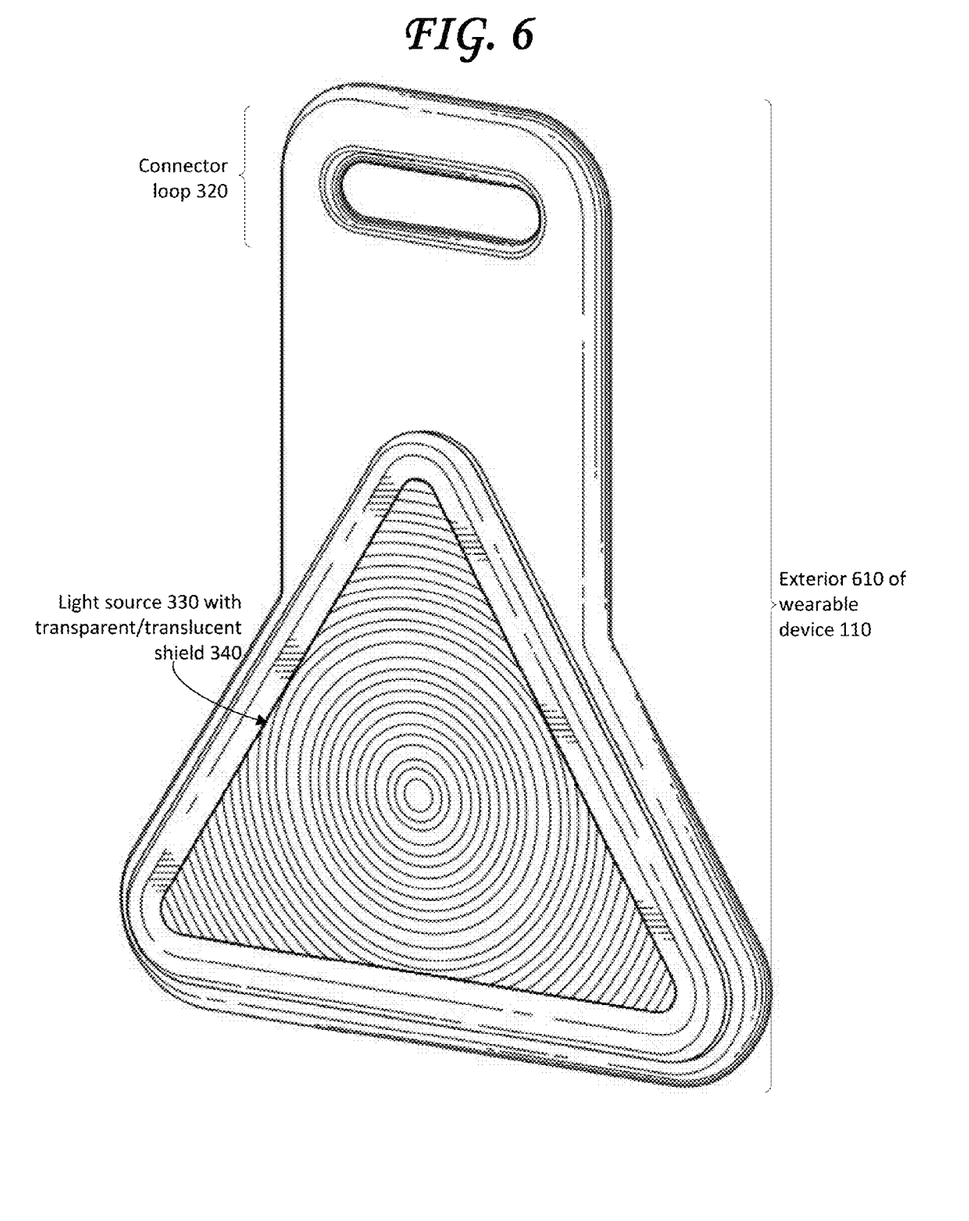
FIG. 6 illustrates a wearable device with a triangular textured light source shield and a thin rounded connector loop.

FIG. 6 illustrates a wearable device with a triangular textured light source shield and a thin rounded connector loop.

The wearable device 110 of FIG. 6 includes an exterior 610 that also has a substantially rounded rectangular shape when seen from the front face, though the light source shield 340 of FIG. 6 is a large enough rounded textured triangle to modify the shape of the exterior 610 on the end it is on. The connector loop 320 of FIG. 6 is small and thin.

Figure 7:
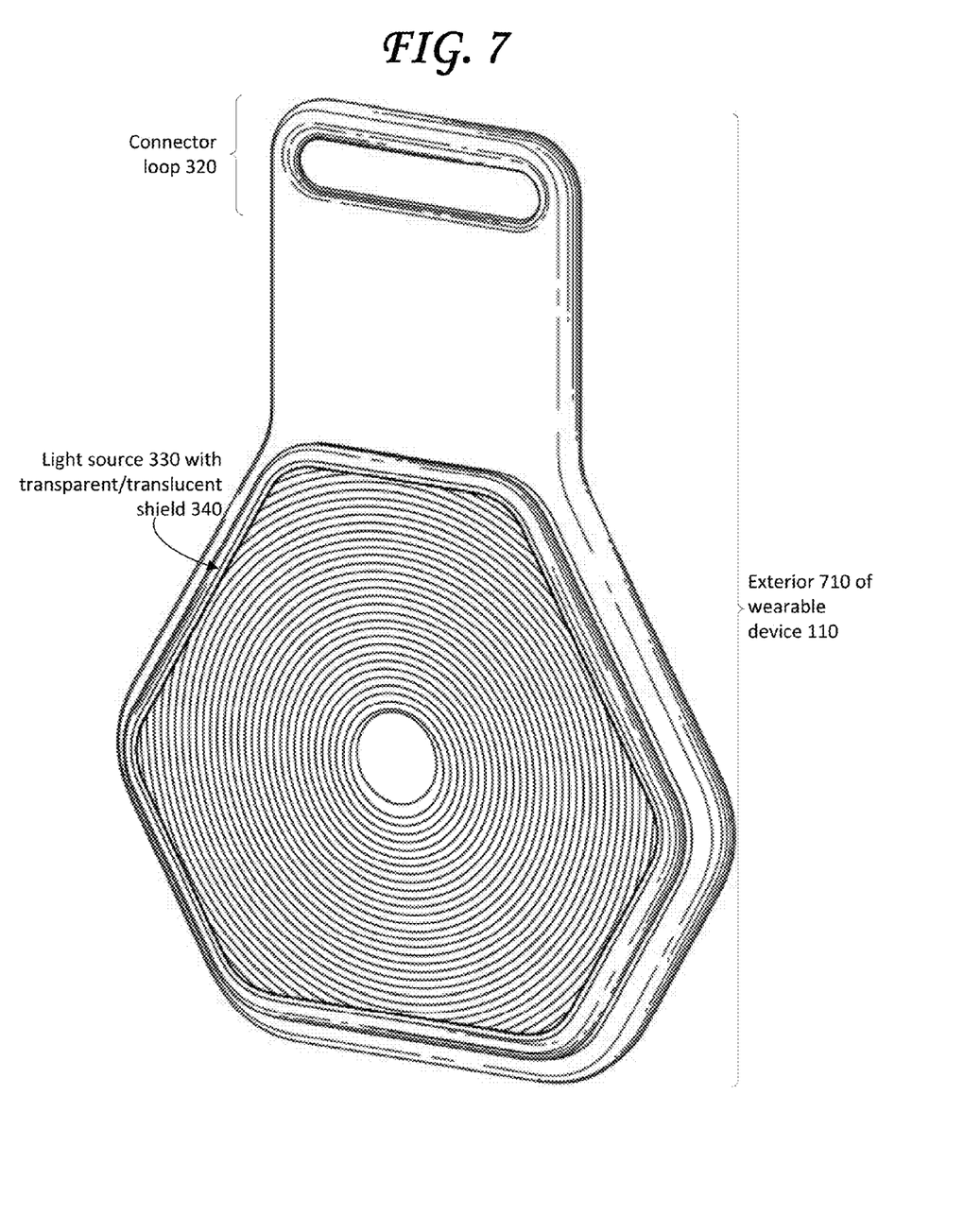
FIG. 7 illustrates a wearable device with a hexagonal textured light source shield and a thin rounded connector loop.

FIG. 7 illustrates a wearable device with a hexagonal textured light source shield and a thin rounded connector loop.

The wearable device 110 of FIG. 7 includes an exterior 810 that also has a substantially rounded rectangular shape when seen from the front face, though the light source shield 340 of FIG. 7 is a large enough rounded textured hexagon to modify the shape of the exterior 810 on the end it is on. The connector loop 320 of FIG. 7 is small and thin.

Figure 8A:
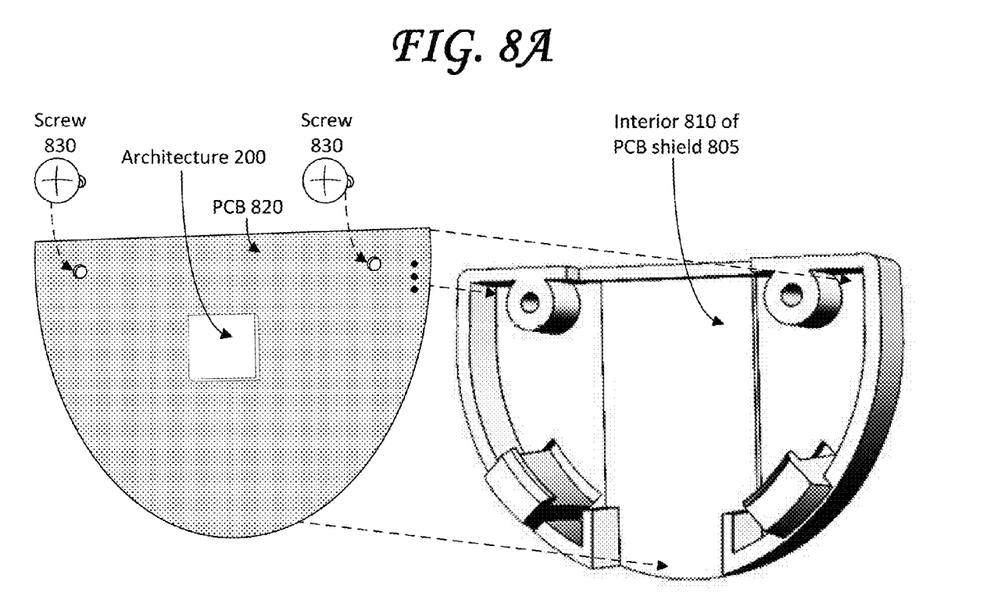
FIG. 8A illustrates a printed circuit board (PCB) and an interior of a shield for the PCB.

FIG. 8A illustrates a printed circuit board (PCB) and an interior of a shield for the PCB.

The printed circuit board (PCB) 820 of FIG. 7A includes at least a subset of the architecture 100, which is illustrated in FIG. 8A as a single flat boxy component on the PCB 820 for the sake of simplicity, it should be understood that the PCB 820 include numerous circuit components such as the various processors, sensors, GPS receivers, and light sources discussed above.

Figure 9:
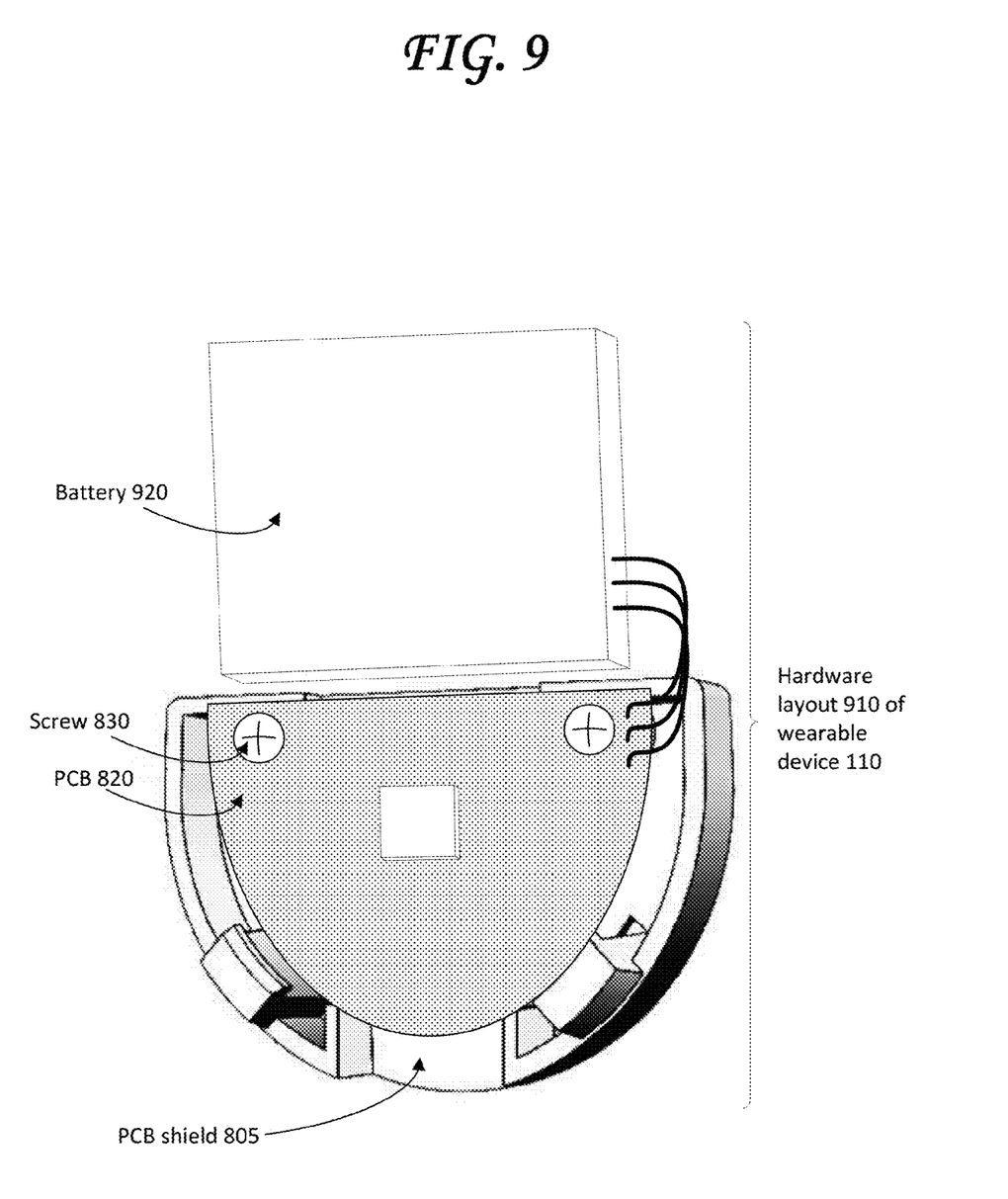
FIG. 9 illustrates a hardware layout of the wearable device.

The PCB 820 of FIG. 8A may be screwed to a PCB shield 805 using screws 830 to form part of the hardware layout 910 illustrated in FIG. 9. The PCB shield 805 may be made of insulative materials that do not electrically conduct, such as plastic, ceramic, glass, silicone, rubber, or some combination thereof. The PCB shield 805 may include tabs, clips, clamps, elastic components along its interior 810 to help hold the PCB 820 in place and protect the PCB 820 from touching anything that could cause it to short circuit. The PCB shield 805 may in some cases add waterproofing and/or dustproofing to protect the PCB 820 from water and/or dust.

Figure 8B:
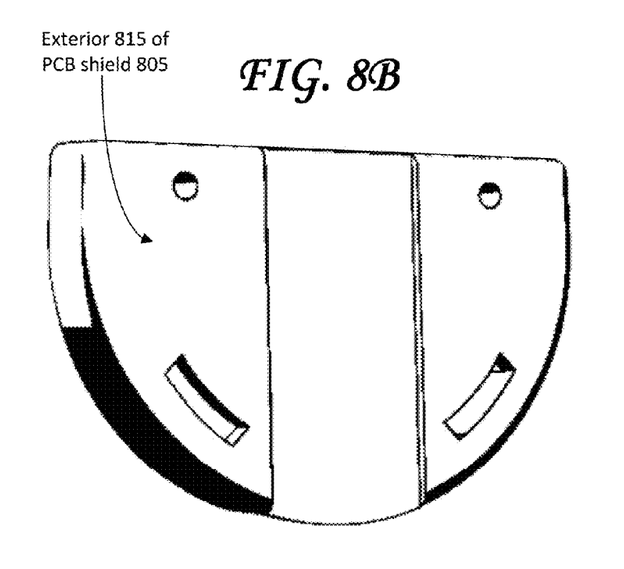
FIG. 8B illustrates an exterior of the shield for the printed circuit board (PCB).

Though the PCB shield 805 of FIG. 8A, FIG. 8B, and FIG. 9 is illustrated as protecting only one side of the PCB 820, it should be understood that a similar second PCB shield 805 may be used to protect the other half, or that the PCB shield 805 may be modified to cover the entirety of the PCB 820. One side of such a PCB shield 805 may be at least partially transparent or translucent to act as part of the light source shield 340 for the light source 330, which may be located on or connected to the PCB 820.

FIG. 8B illustrates an exterior of the shield for the printed circuit board (PCB).

The exterior 815 of the PCB shield 805 may be made from the same material as the interior 810 of the PCB shield 805, or it may be made from a different material.

FIG. 9 illustrates a hardware layout of the wearable device.

The hardware layout 910 of the wearable device 110 includes the PCB 820, PCB shield 805, and screws 830 of FIG. 8A, and also includes a battery 920 connected to and powering the PCB 820. The battery 920 may be a rechargeable battery, such as a lithium ion, lithium polymer, or nickel cadmium batter. The battery 920 may alternately be a non-rechargeable replaceable battery.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A system for venue guest interactivity, the system comprising:
    one or more guest information servers storing guest information that indicates that a guest corresponding to a unique identification code has a ticket authorizing access to a physical locale within a venue; and
    a wearable device corresponding to the guest, the wearable device comprising:
        a memory storing instructions and the unique identification code, wherein the unique identification code corresponds to the guest information stored at the one or more guest information servers,
        a wireless communication interface that provides the unique identification code to a venue terminal located within the venue, and receives from the venue terminal a status of the wearable device indicating that the guest has the ticket authorizing access to the physical locale within the venue,
        a processor that, upon execution of the instructions, detects a removal of a second device from a proximity of the wearable device via the wireless communications interface and updates the status of the wearable device to terminate access to the physical locale within the venue in response to detecting the removal of the second device from the proximity of the wearable device, and
        a light source that emits a first visual effect that indicates authorization to access the physical locale within the venue, wherein the light source later emits a second visual effect that indicates termination of access to the physical locale within the venue in response to the processor updating the status of the wearable device to terminate access to the physical locale within the venue.

2. The system of claim 1, wherein the light source includes more than one light.

3. The system of claim 1, wherein the one or more guest information servers generate a map, the map including an icon corresponding to at least a location of the wearable device and the status of the wearable device.

4. The system of claim 1, wherein the processor of the wearable device also terminates access to funds corresponding to a credit card in response to detecting the removal of the second device from the proximity of the wearable device.

5. A wearable device for venue guest interactivity, the wearable device comprising:
    a memory storing instructions and a unique identification code that corresponds to guest information, the guest information indicating that a guest corresponding to the unique identification code has a ticket authorizing access to a physical locale within a venue;
    a wireless communication interface that detects a removal of a second device from a proximity of the wearable device;
    a processor that, upon execution of the instructions, updates a status of the wearable device from indicating access to the physical locale within the venue to terminate access to the physical locale within the venue in response to detecting the removal of the second device from the proximity of the wearable device; and
    a light source that emits a first visual effect that indicates authorization to access the physical locale within the venue, wherein the light source later emits a second visual effect that indicates termination of access to the physical locale within the venue in response to the processor updating the status of the wearable device to terminate access to the physical locale within the venue.

6. The wearable device of claim 5, wherein the wireless communication interface includes a near-field communication (NFC) wireless communication interface.

7. The wearable device of claim 5, wherein the wireless communication interface includes a radio-frequency identification (RFID) wireless communication interface.

8. The wearable device of claim 5, wherein the wireless communication interface includes a Bluetooth® wireless communication interface.

9. The wearable device of claim 5, wherein the light source emitting the first visual effect includes the light source emitting a first color, and wherein the light source emitting the second visual effect includes the light source emitting a second color.

10. The wearable device of claim 5, wherein the light source emitting the first visual effect includes the light source emitting a first blinking pattern, and wherein the light source emitting the second visual effect includes the light source emitting a second blinking pattern.

11. The wearable device of claim 5, wherein the second device is a mobile phone device corresponding to the guest.

12. The wearable device of claim 5, wherein the second device corresponds to a friend of the guest.

13. The wearable device of claim 5, wherein the second device corresponds to a family member of the guest.

14. The wearable device of claim 5, further comprising a biometric sensor, wherein the light source emits the second visual effect in response to the biometric sensor determining that the wearable device is worn by someone other than the guest corresponding to the unique identification code.

15. The wearable device of claim 5, wherein the wearable device enables emission of light at the light source in response to detection by the wireless communication interface that the wearable device is within wireless communicative range of a venue wearable device reader within the venue.

16. The wearable device of claim 5, wherein the wearable device disables emission of light via the light source in response to detection, using the wireless communication interface, that the wearable device has not been within wireless communicative range of a venue wearable device reader within the venue for at least a predetermined threshold period of time.

17. The wearable device of claim 5, further comprising a Global Positioning System (GPS) receiver that identifies a location of the wearable device.

18. The wearable device of claim 5, wherein the light source emits a third visual effect to indicate that the guest has a specific allergy.

19. A method of venue guest interactivity, the method comprising:

storing a unique identification code within a memory of a wearable device associated with a guest, wherein the unique identification code corresponds to guest information stored at one or more guest information servers that indicates that the guest has a ticket authorizing access to a physical locale within a venue;

emitting a first visual effect via a light source of the wearable device, the first visual effect indicating a status of the wearable device corresponding to authorization to access the physical locale within the venue;

detecting a removal of a second device from a proximity of the wearable device via a wireless communications interface of the wearable device;

updating the status of the wearable device to terminate access to the physical locale within the venue in response to detecting the removal of the second device from the proximity of the wearable device; and emitting a second visual effect via the light source of the wearable device in response to updating the status of the wearable device to terminate access to the physical locale within the venue, the second visual effect indicating the status of the wearable device corresponding to termination of access to the physical locale within the venue.

20. The method of claim 19, further comprising providing the unique identification code from the wearable device to a venue terminal via the wireless communications interface of the wearable device.

* * * * *